United States Patent [19]

Handke

[11] Patent Number: 4,574,880

[45] Date of Patent: Mar. 11, 1986

[54] INJECTOR UNIT

[75] Inventor: Wayne A. Handke, Duncan, Okla.

[73] Assignee: Halliburton Company, Duncan, Okla.

[21] Appl. No.: 573,083

[22] Filed: Jan. 23, 1984

[51] Int. Cl.⁴ .................... E21B 34/02; E21B 41/00
[52] U.S. Cl. .................................. 166/75.1; 250/260
[58] Field of Search ............... 166/75 A, 75 R, 271, 166/275, 280, 252, 247; 222/83.5; 250/260, 259

[56] References Cited

U.S. PATENT DOCUMENTS

| 2,163,436 | 6/1939 | Raymond et al. | 166/75 |
| 2,884,067 | 4/1959 | Marken | 166/75 |
| 3,228,472 | 1/1966 | Rhoads, Jr. | 166/75 |
| 3,292,527 | 12/1966 | Stasse | 222/83.5 X |
| 4,064,936 | 12/1977 | McClure | 166/75 R |
| 4,199,680 | 4/1980 | Moon | 250/260 |

Primary Examiner—Stephen J. Novosad
Assistant Examiner—Thuy M. Bui
Attorney, Agent, or Firm—James R. Duzan; Thomas R. Weaver

[57] ABSTRACT

An injection unit for injecting radioactive propping material into fracturing fluids containing propping materials used in hydraulic fracturing operations.

8 Claims, 6 Drawing Figures

INJECTOR UNIT

BACKGROUND OF THE INVENTION

This invention relates to a radioactive tracer material injector for use in injecting radioactive tracer material into fracturing fluids used in oil and gas well hydraulic fracturing operations.

In oil and gas well hydraulic fracturing operations radioactive propping materials are sometimes injected into the fracturing fluid which carries the materials into a fracture formed in an earthen formation. When the radioactive propping materials are present in the formation a variety of information may be determined about the hydraulic fracturing operation, such as fracture location with respect to depth, type of fracture produced, number of fractures produced, estimation of fracture thickness, effectiveness of fracturing method, etc.

In such hydraulic fracturing operations employing the use of radioactive propping materials it is only necessary that a small amount of radioactive propping material be present in the proppant ladden fracturing fluids utilized to hydraulically fracture the earthen formation. Since the tracer proppant material mixed into the fracturing fluid is radioactive in nature, the storage, handling and use of such radioactive propping material is regulated by various governmental agencies and laws. Therefore, it is necessary to be able to inject or mix small amounts of such radioactive propping material into the fracturing fluid during the hydraulic fracturing operation without contaminating either personnel conducting the hydraulic fracturing operation or the area where the equipment is located for performing the hydraulic fracturing operation and to allow easy clean-up of residual radioactive propping material in the injection equipment at the termination of the hydraulic fracturing operation.

One such prior art injection equipment for injecting radioactive propping materials is illustrated in U.S. Pat. No. 4,199,680.

STATEMENT OF THE INVENTION

The present invention is directed to an injection unit for injecting radioactive propping material into fracturing fluids containing propping materials used in hydraulic fracturing operations.

The injection unit comprises a skid unit having a frame, a hopper, controlled fluid reservoir, sight tube, injection pump, metering valve for controlling the flow of materials from the hopper and injection pump discharge controls.

The features and advantages of the present invention will be readily apparent to those skilled in the art upon a reading of the following disclosure when taken in conjunction with the accompanying drawings.

DESCRIPTION OF THE INVENTION

Figure 1:
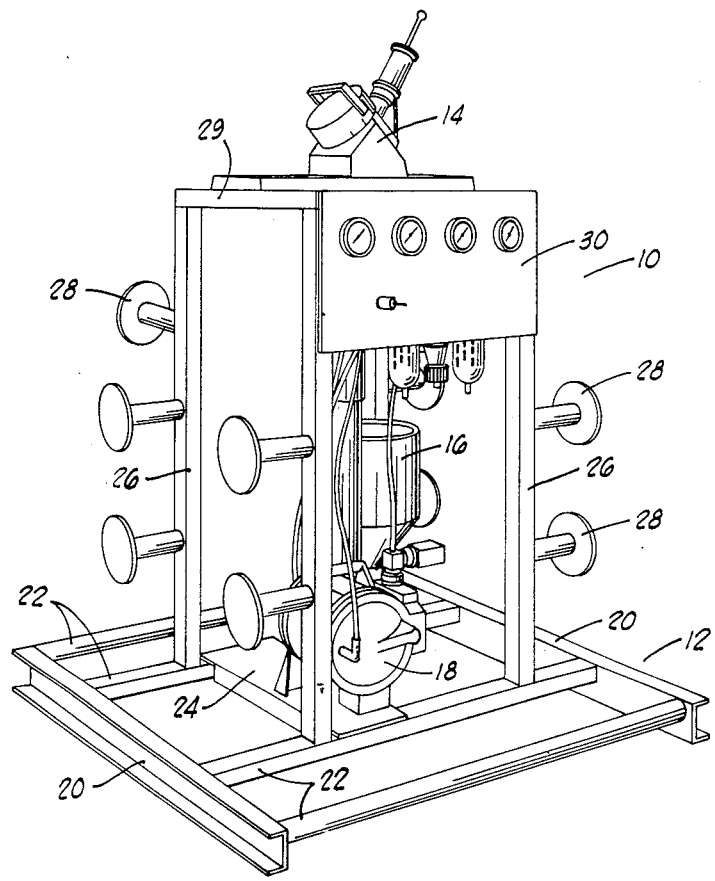
FIG. 1 is a perspective view of the injection unit of the present invention.

Referring to FIG. 1, the injection unit 10 of the present invention is shown.

The injection unit 10 comprises a base 12, hopper 14, fluid reservoir 16, injection pump 18 and various pressure gauges and control valves.

The base 12 comprises a rectangular frame having side rails 20, a plurality of lower cross members 22, intermediate member 24, a plurality of vertical members 26 having a plurality of hose rack members 28 thereon, and a plurality of upper cross members 29.

As shown, the injection unit 10 further includes a control panel 30 from which the unit may be operated having a plurality of gauges located thereon.

Figure 2:
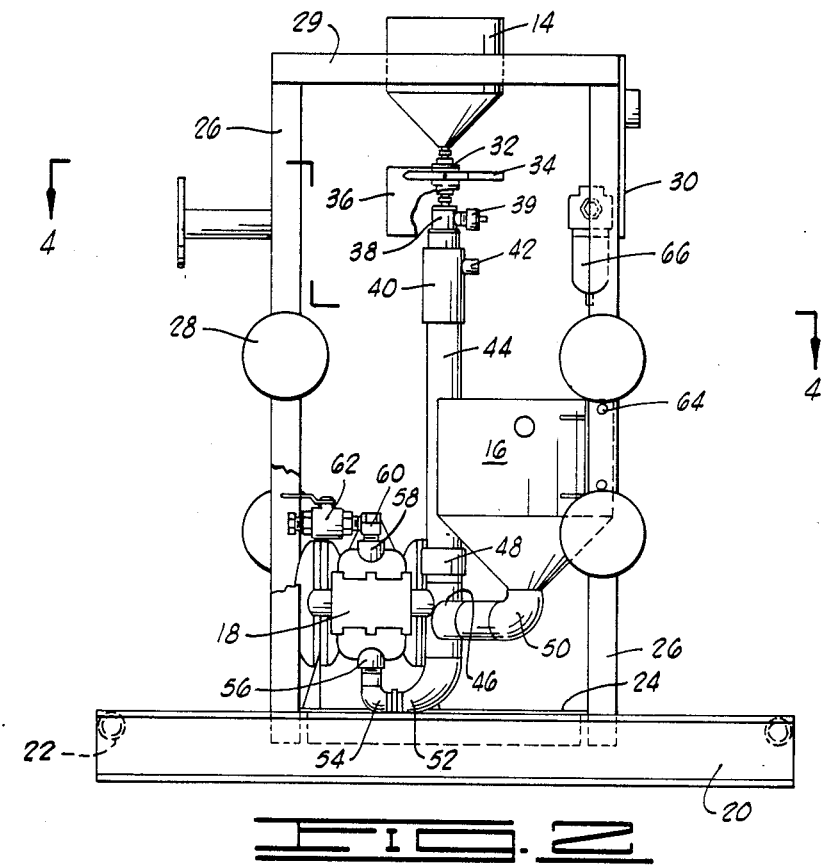
FIG. 2 is a side view of the injection unit of the present invention.

Referring to FIG. 2, the injection unit 10 is shown from the side. The hopper 14 is sealingly connected to material control valve 32 having handle 34 thereon and rate indicator plate 36 secured thereto. The outlet of material control valve 32 is sealingly connected to vent adapter 38 having, in turn, vent 39 thereon which is, in turn, sealingly connected to eductor 40 having, in turn, fluid inlet 42 on one side thereof.

The eductor 40 comprises an annular housing member having an annular sleeve located therein through which the proppant material from the hopper 14 falls while fluid entering fluid inlet 42 flows into the annular space between the housing member and annular sleeve therein to provide an annular fluid flow around the proppant material falling through the center of the annular sleeve.

Sealingly connected to the lower end of eductor 40 is sight tube 44. Sight tube 44 comprises an annular tube having a transparent wall so that the level of fluid and proppant material within the tube 44 may be observed visually.

The sight tube 44 is sealingly connected to the suction manifold 46 at one inlet end 48 thereof. Also sealingly connected to another inlet end 50 of the suction manifold 46 is fluid reservoir 16.

Sealingly connected to the outlet 52 of suction manifold 46 is one end pump suction manifold 54 while the other end thereof is sealingly connected to the inlet 56 of the pump 18.

The pump 18 may be of any suitable type capable of pumping an abrasive slurry, although a model SB1-A pump sold by The Warren Rupp Company of Mansfield, Ohio is preferred.

Sealingly secured to outlet 58 of pump 18 is adapter 60 having control valve 62 sealingly secured thereto.

The fluid reservoir 16 is releasably secured at 64 to a vertical member 26 of base 12.

Also shown in FIG. 2 is an pneumatic regulator, lubricator, and filter assembly 66 which is releasably mounted on control panel 30 of the injection unit 10. Although any assembly 66 may be used, a model series 26 unit, manufactured by Wilkerson Corporation of Englewood, Colo. is preferred.

Figure 3:
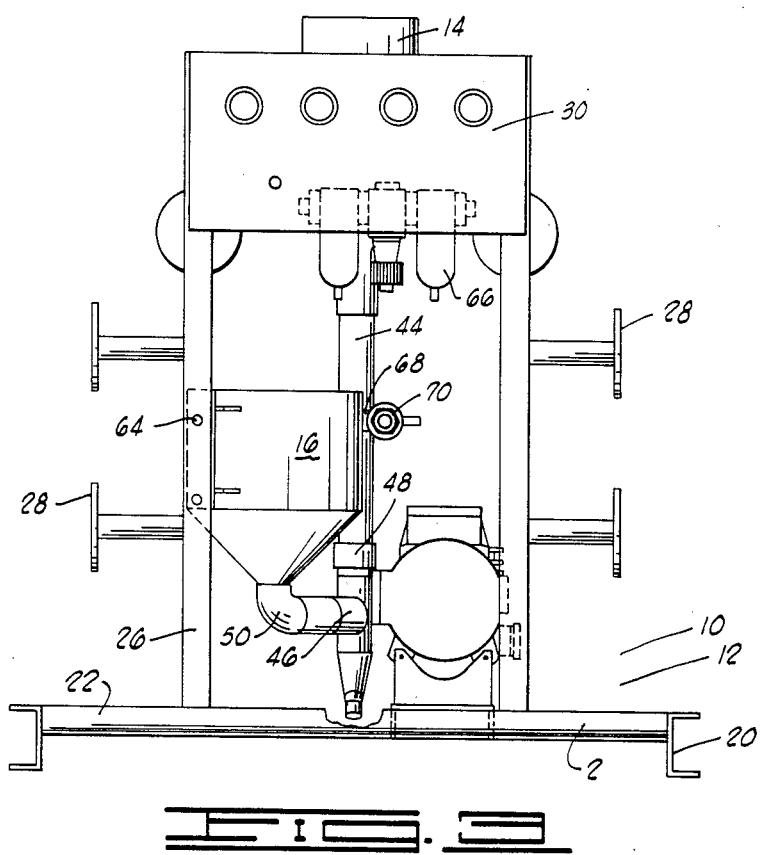
FIG. 3 is a front view of the injection unit of the present invention.

Referring to FIG. 3, the injection unit 10 is shown in front view. As shown, the fluid reservoir 16 contains fluid inlet 68 thereto having control valve 70 sealingly connected thereto.

Figure 4:
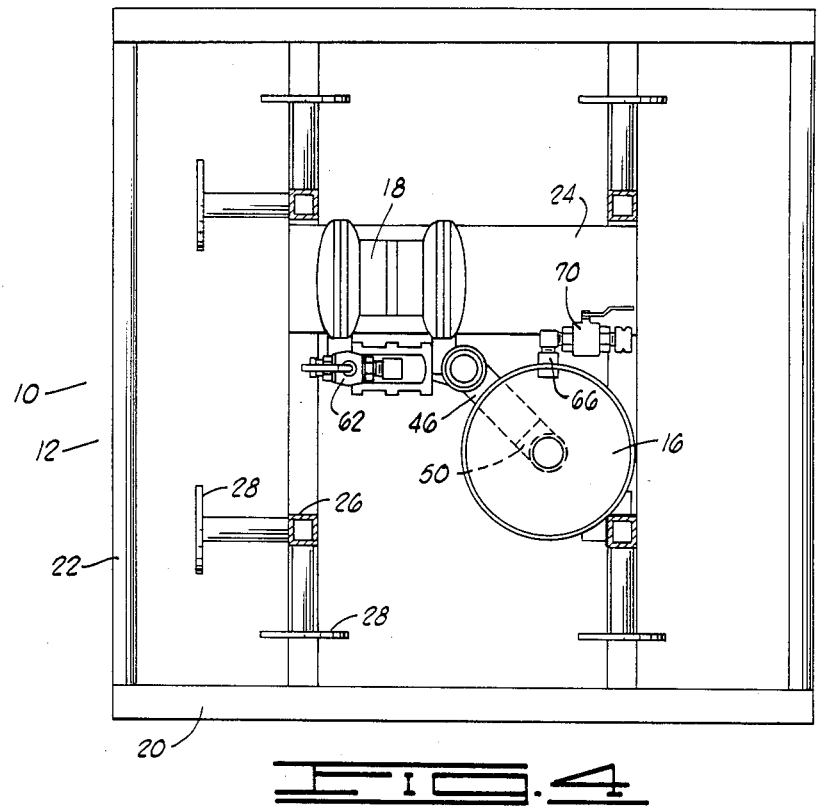
FIG. 4 is a top view of the injection unit of the present invention.

Referring to FIG. 4, the injection unit 10 is shown from the top to further illustrate the relationship between some of the various components.

Figure 5:
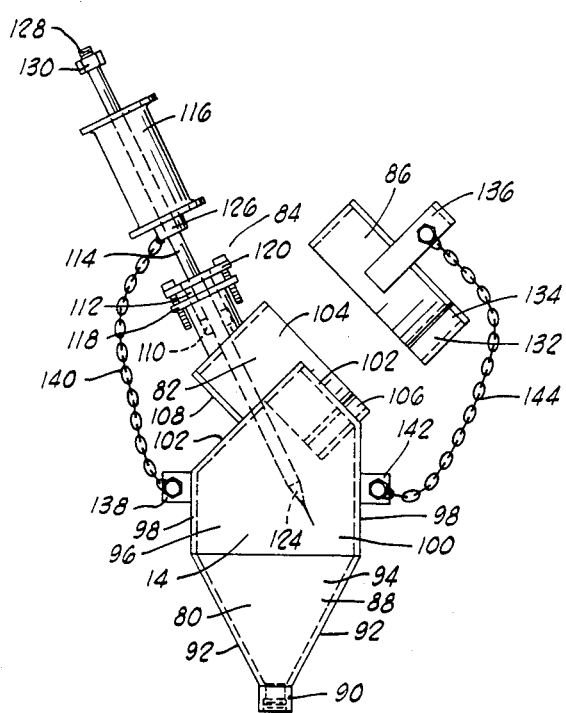
FIG. 5 is a cross-sectional view of the material hopper of the present invention.

Referring to FIG. 5, the hopper 14 is shown. The hopper 14 comprises an enclosed hopper housing 80 having a material container portion 82, container opener assembly 84 and lid 86.

The hopper housing 80 comprises an enclosed bottom portion 88 having an outlet 90 therefrom, side walls 92 and end walls 94 and enclosed upper portion 96 having side walls 98, end walls 100 and top walls 102.

The material container portion 82 comprises a generally cylindrical member 104 having rectangular portion 106 extending therefrom and bottom 108. The material container portion 82 extends through top walls 102 of hopper housing 80 being secured thereto.

The container opener assembly 84 comprises mount 110, guide 112, piercing member 114 and hammer 116.

The mount 110 comprises an annular cylindrical member having a bore therethrough, one end secured to material container portion 104 and guide mounting flange 118 secured to the other end thereof.

The guide 112 comprises elongated annular cylindrical member slidably received within the bore of mount 110 having a bore therethrough, and mounting flange 120 on one end thereof. The relationship of guide 112 with respect to mount 110 may be adjusted by means of threaded members 122 which engage mounting flanges 118 and 120 of the mount 110 and guide 112 respectively.

The piercing member 114 comprises an elongated cylindrical member slidably received in the bore through guide 112 having a point 124 on one end thereof, stop 126 secured thereto, threaded portion 128 on the other end thereof.

The hammer 116 comprises an elongated cylindrical member slidably received on piercing member 114 having a bore therethrough. The hammer is releasably retained on piercing member 114 by means of threaded fastener 130 threadedly, releasably engaging threaded portion 128 of piercing member 114.

The lid 86 comprises a generally cylindrical member having a rectangular portion 132, the lid 86 being slidably received over member 104 and portion 106 of material container portion 82, a top 134 and handle 136 secured thereto.

The hopper 14 further includes bracket 138 having one end of chain 140 secured thereto which has the other end thereof secured to hammer 116 and bracket 142 having one end of chain 144 secured thereto which has the other end thereof secured to lid 86.

Figure 6:
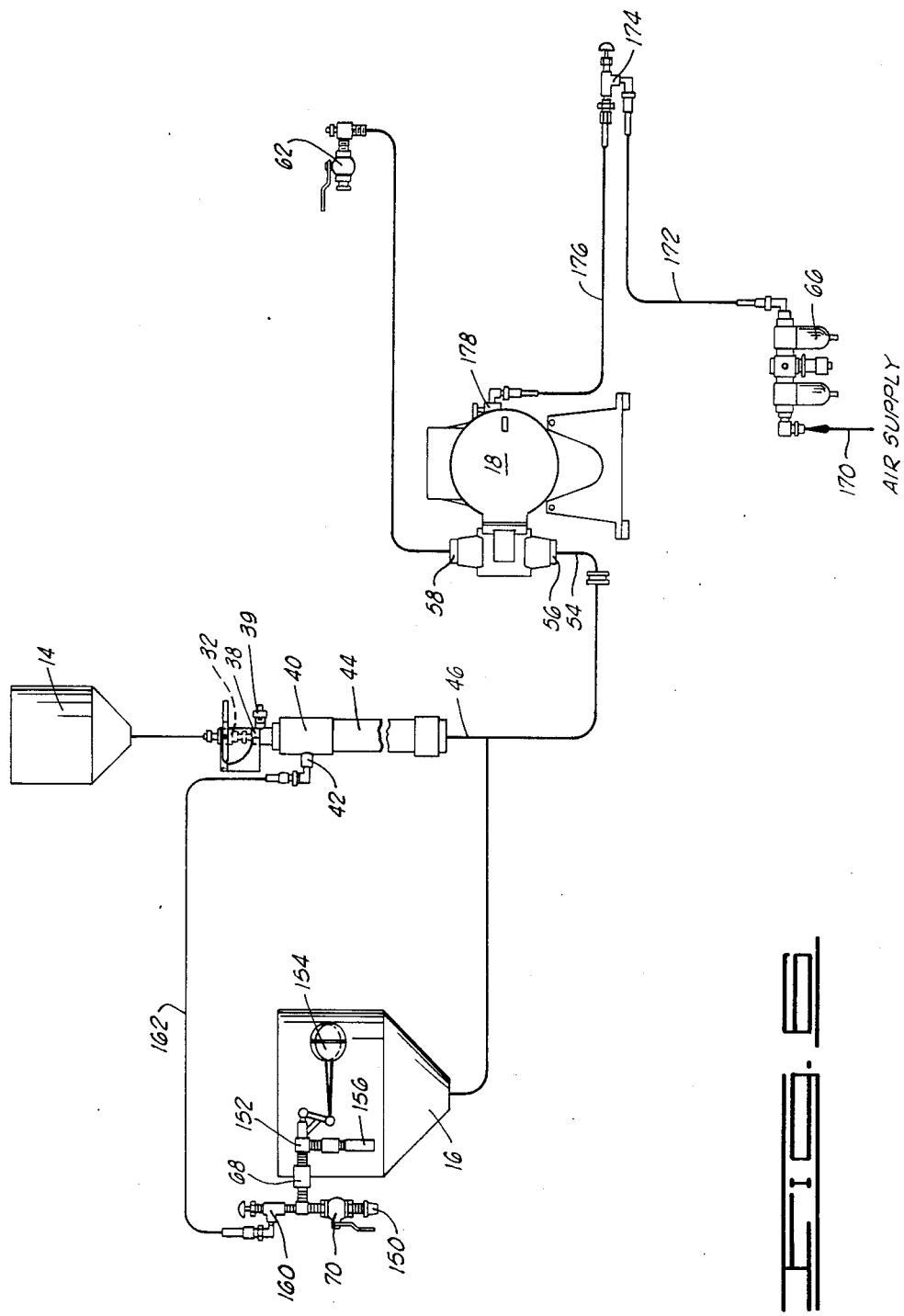
FIG. 6 is a fluid system diagram of the present invention.

Referring to FIG. 6, the various fluid flow circuitry of the injection unit 10 is shown.

Clean fracturing fluid; i.e., fluid which contains no proppant material therein, is supplied to the injection unit 10 via fluid line 150 being controlled therefrom by control valve 70. From control valve 70 fluid flows into fluid reservoir 16 through inlet 68. The fluid level in the fluid reservoir 16 is controlled by means of a floating type fluid control valve 152 having float 154 thereon and outlet 156 therefrom.

Fluid also flows from control valve 70 through needle type control valve 160 and through fluid line 162 to inlet 42 of eductor 40 where the fluid flows around the radioactive proppant material from hopper 14 flowing through the center of eductor 40 via control valve 32 and vent adapter 38.

Fluid from fluid reservoir 16 and fluid and radioactive proppant material from hopper 14 flow into suction manifold 46, through pump suction manifold 54 and into pump inlet 56 of pump 18.

Fluid and proppant exits the pump 18 from outlet 58 with the outlet flow rate being controlled by control valve 62.

The pump 18 is pneumatically powered by air flowing into pneumatic regulator, lubricator and filter assembly 66 via line 170. Air flows from assembly 66 via line 172 to control valve 174 and, subsequently, therefrom via line 176 to pump 18 air inlet 178.

OPERATION OF THE INVENTION

Referring to FIGS. 1 and 6, initially, an air supply line 170 is connected to assembly 66, a supply of fracturing fluid having no proppant material therein is connected to fluid line 150 and a container of radioactive proppant material is inserted into material container portion 82 of hopper 14 having lid 86 thereon.

The container of radioactive proppant material inserted into hopper 14 is opened by piercing the container using the container opener assembly 84. Once the container of radioactive proppant material has been pierced and the piercing member 114 has been withdrawn therefrom, the radioactive proppant material flows from the container into bottom portion 88 of the hopper 14. The flow of material from hopper 14 being controlled by valve 32.

When material exits from valve 32 into eductor 40, it is surrounded with a small flow of fluid which serves to clean the wall of sight tube 44 so that the level of material in the tube 44 may be readily observed.

The radioactive material and small amount of fluid in sight tube 44 exits therefrom and is mixed with more clean fracturing fluid from fluid reservoir 16 in suction manifold 46, the clean fracturing fluid entering manifold 46 via inlet 50 while the radioactive material and small amount of fluid enter via inlet 48.

The radioactive material and fluid exits suction manifold 46 via outlet 52, enters pump suction manifold 54 and enters pump 18 via inlet 56 thereto.

Radioactive material and fluid exits pump 18 via outlet 58 having control valve 62 connected thereto to control the rate of fluid flow therefrom.

After the radioactive material and fluid exits control valve 62, it is subsequently pumped into the suction manifold of a pump used to pump fracturing fluid to hydraulically fracture the earthen formation.

The rate at which pump 18 operates is controlled by the supply of air thereto which is controlled via valve 174 having lines 172 and 176 connected thereto.

The rate at which clean fluid flows into the eductor 40 to surround the radioactive proppant material from hopper 14 is controlled by valve 160.

The fluid level in fluid reservoir 16 is controlled by valve 152.

After a container of radioactive proppant material has been emptied into hopper 14, the empty container is removed from the hopper 14 and another emptied thereinto.

The present invention of an injection unit offers the advantage of containing the radioactive proppant material within the system during operations to minimize the contamination of equipment, personnel or the site with the material during operations.

Having thus described my invention, I claim:

1. An injection unit for the metering and injection of tracer materials into fluids used in a hydraulic well fracturing operation of an earthen formation pentrated by a well bore, said fluid being pumped into said well bore and earthen formation by a pump means located on the surface of the earth, said injection unit comprising:
   a base formed by side rails interconnected by crossmembers having an intermdiate member therebetween and a plurality of vertical members extending therefrom;
   an enclosed hopper for containing said tracer materials therein associated with the base being mounted thereon;
   a fluid reservoir for containing an amount of said fluid therein associated with the base being mounted thereon;
   an injection pump for pumping a mixture of said tracer materials from the hopper and said fluid from the fluid reservoir to said pump means, the injection pump being mounted on the base;
   a sight tube communicating with the enclosed hopper and the injection pump, the sight tube having an inlet and outlet;
   a metering valve connnected to the hopper to control the flow of said tracer materials from the hopper;
   a control valve to control the flow of the mixture of said tracer material from the hopper and said fluid from the fluid reservoir from the injection pump, the control valve being connected to the outlet of the injection pump;
   an eductor having the inlet thereof communicating with the metering valve controlling the flow of said tracer materials from the hopper and the outlet thereof cimmunicating with the inlet of the sight tube; and
   a suction manifold connected of the outlet of the sight tube, the outlet of the fluid reservoir and the inlet of the injection pump.

2. The injection unit of claim 1 further comprising:
   a vent adapter connected to the metering valve controlling the flow of said tracer materials from the hopper and to the inlet of the eductor;
   a regulator, lubricator and filter assembly assoicated with the base and mounted thereon for regulating, supplying lubrication to and filtering the air supplied to the injector unit; and
   a pump suction manifold having one end thereof connected to the suction manifold and the other end thereof connected to the inlet of the injection pump.

3. The injection unit of claim 2 wherein the base further comprises:
   hose rack members mounted on the plurality of vertical members and a control panel located between two vertical members of the plurality.

4. The injection unit of claim 3 wherein the hopper comprises:
   an enclosed hopper housing having a container portion, container opener assembly and lid.

5. The injection unit of claim 4 wherein the container opener assembly comprises:
   a mount;
   a guide;
   a piercing member slidably received within the mount and the guide; and
   a hammer slidably disposed on the piercing member.

6. The injection unit of claim 1 wherein the injection pump comprises:
   a pneumatically operated injection pump.

7. The injection unit of claim 6 further comprising:
   a control valve communicating with the regulator, lubricator and filter assembly and 5 the injection pump to control the flow of air to the injection pump
   thereby controlling the rate at which the injection pump operates to inject said tracer materials into said fluids being pumped by said pump means.

8. The injection unit of claim 7 further comprising:
   a first control valve for controlling the flow of said fluid to the fluid reservoir;
   a needle control valve for controlling the flow of said fluid to the eductor from the flow of said fluid from the first control valve for controlling the flow of said fluid to the fluid reservoir to the eductor; and
   a floating type fluid control valve controlling the flow of said fluid into the fluid reservoir.

* * * * *

UNITED STATES PATENT AND TRADEMARK OFFICE
CERTIFICATE OF CORRECTION

PATENT NO. : 4,574,880

DATED : March 11, 1986

INVENTOR(S) : Wayne A. Handke

It is certified that error appears in the above-identified patent and that said Letters Patent is hereby corrected as shown below:

In column 5, line 34, delete the word [cimmunicating] and insert therefor --communicating--.

Signed and Sealed this

Second Day of December, 1986

*Attest:*

DONALD J. QUIGG

*Attesting Officer*  *Commissioner of Patents and Trademarks*